US010208534B2

(12) United States Patent
Dekker et al.

(10) Patent No.: US 10,208,534 B2
(45) Date of Patent: Feb. 19, 2019

(54) RAIL FOR AN ARCHITECTURAL COVERING

(71) Applicant: Hunter Douglas Industries B.V., Rotterdam (NL)

(72) Inventors: Nicolaas Dekker, Rotterdam (NL); Ralph Steenbergen, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 15/026,511

(22) PCT Filed: Sep. 30, 2014

(86) PCT No.: PCT/NL2014/000035
§ 371 (c)(1),
(2) Date: Mar. 31, 2016

(87) PCT Pub. No.: WO2015/050434
PCT Pub. Date: Apr. 9, 2015

(65) Prior Publication Data
US 2016/0230455 A1 Aug. 11, 2016

(30) Foreign Application Priority Data

Oct. 1, 2013 (NL) .................................... 1040419
Oct. 1, 2013 (NL) .................................... 1040420

(51) Int. Cl.
*E06B 9/322* (2006.01)
*E06B 9/323* (2006.01)
(Continued)

(52) U.S. Cl.
CPC .............. *E06B 9/322* (2013.01); *E06B 9/323* (2013.01); *E06B 9/38* (2013.01); *E06B 2009/3222* (2013.01); *F03G 1/00* (2013.01)

(58) Field of Classification Search
CPC . E06B 9/322; E06B 9/323; E06B 9/32; E06B 2009/3222
See application file for complete search history.

(56) References Cited

U.S. PATENT DOCUMENTS 210,279 A    11/1878  Watkeys
2,276,716 A   3/1942  Cardona
(Continued)

FOREIGN PATENT DOCUMENTS

BE      724504 A      5/1969
DE      1509225 A1    5/1969
(Continued)

OTHER PUBLICATIONS

Search Report, Netherlands Patent Application No. 138817, NL 1040419, dated Mar. 2014, pp. 1-7.
(Continued)

*Primary Examiner* — Katherine W Mitchell
*Assistant Examiner* — Jeremy C Ramsey
(74) *Attorney, Agent, or Firm* — Dority & Manning, P.A.

(57) ABSTRACT

A rail, such as a head rail, for an architectural covering. The rail includes a housing having elongate walls extending along a length of the housing and defining therebetween a width of the housing. A drive shaft is rotatable about a drive axis extending along the length of the housing and is configured to wind and unwind lift cords of the architectural covering. A spring assist module, e.g. a spring motor has an output shaft rotatable about an output axis with rotation of the drive shaft. The spring motor is mounted in the housing with the output axis parallel to the drive axis, but offset from the drive axis with respect to the width of the housing and the output shaft is connected directly to the drive shaft for rotation therewith.

34 Claims, 4 Drawing Sheets

(51) Int. Cl.
*E06B 9/38* (2006.01)
*F03G 1/00* (2006.01)

(56) References Cited

U.S. PATENT DOCUMENTS

| | | | |
|---|---|---|---|
| 4,456,049 A * | 6/1984 | Vecchiarelli | E06B 9/307 |
| | | | 160/107 |
| 4,531,563 A * | 7/1985 | Nilsson | E06B 9/32 |
| | | | 160/168.1 R |
| 5,010,940 A * | 4/1991 | Marocco | E06B 9/36 |
| | | | 160/168.1 R |
| 5,133,399 A * | 7/1992 | Hiller | E06B 9/30 |
| | | | 160/170 |
| 5,328,113 A | 7/1994 | de Chevron Villette et al. | |
| 6,056,036 A * | 5/2000 | Todd | E06B 9/262 |
| | | | 160/84.01 |
| 6,662,850 B2 * | 12/2003 | Chung | E06L 39/32 |
| | | | 160/171 |
| 6,915,831 B2 | 7/2005 | Anderson | |
| 7,546,866 B2 | 6/2009 | Strand et al. | |
| 7,624,785 B2 * | 12/2009 | Yu | E06B 9/322 |
| | | | 160/171 |
| 7,832,453 B2 | 11/2010 | Lin | |
| 7,866,367 B2 | 1/2011 | Liang et al. | |
| 8,193,742 B2 | 6/2012 | Skinner et al. | |
| 8,281,843 B2 * | 10/2012 | Yu | E06B 9/303 |
| | | | 160/170 |
| 9,903,157 B2 * | 2/2018 | Dekker | E06B 9/322 |
| 2002/0020506 A1 * | 2/2002 | Dekker | E06B 9/307 |
| | | | 160/115 |
| 2002/0033240 A1 | 3/2002 | Toti | |
| 2002/0079067 A1 | 6/2002 | McCarty et al. | |
| 2004/0261954 A1 | 12/2004 | Holt et al. | |
| 2005/0217805 A1 | 10/2005 | Strand et al. | |
| 2007/0029052 A1 | 2/2007 | Nien et al. | |
| 2008/0236764 A1 | 10/2008 | Cheng | |
| 2009/0283226 A1 | 11/2009 | Cheng | |
| 2013/0233499 A1 | 9/2013 | Wu | |
| 2013/0248125 A1 * | 9/2013 | Lin | E06B 9/262 |
| | | | 160/84.05 |
| 2014/0020851 A1 * | 1/2014 | Ouzts | E06B 9/264 |
| | | | 160/107 |
| 2017/0081915 A1 | 3/2017 | Buccola, Jr. et al. | |

FOREIGN PATENT DOCUMENTS

| | | |
|---|---|---|
| DE | 19505824 A1 | 8/1996 |
| DE | 20008504 U1 | 9/2001 |
| DE | 202007002267 U1 | 7/2007 |
| DE | 202007002543 U1 | 8/2007 |
| DE | 202011102016 U1 | 1/2012 |
| EP | 0330822 A2 | 9/1989 |
| EP | 0677638 A1 | 10/1995 |
| EP | 0796994 A2 | 9/1997 |
| EP | 1039092 A2 | 9/2000 |
| EP | 1671008 A2 | 6/2006 |
| EP | 1690022 A2 | 8/2006 |
| EP | 1933002 A2 | 6/2008 |
| EP | 1983143 A1 | 10/2008 |
| EP | 2386711 A2 | 11/2011 |
| FR | 2847613 A1 | 5/2004 |
| FR | 2955606 A1 | 7/2011 |
| GB | 986529 A | 3/1965 |
| WO | 2009/011681 A1 | 1/2009 |
| WO | 2015/050435 A1 | 4/2015 |

OTHER PUBLICATIONS

Search Report, Netherlands Patent Application No. 138818, NL 1040420, dated Mar. 2014, pp. 1-8.

* cited by examiner

RAIL FOR AN ARCHITECTURAL COVERING

CROSS-REFERENCE TO RELATED APPLICATIONS

This application is the national stage application of International Patent Application No. PCT/NL2014/000035, filed Sep. 30, 2014, entitled "Rail For an Architectural Covering," which claims priority to Netherlands Patent Application No. 1040419, filed Oct. 1, 2013, entitled "Rail For an Architectural Covering" and to Netherlands Patent Application No.1040420, filed Oct. 1, 2013, entitled "Rail For an Architectural Covering," all of which are hereby incorporated by reference herein in their entireties for all purposes.

TECHNICAL FIELD

The present invention relates to a rail, such as a head rail, bottom rail or intermediate rail, for use in an architectural covering having a cover, such as a blind and/or a plurality of slats, that can be moved by means of a mechanism in the rail.

BACKGROUND

Various architectural coverings are known with systems to compensate for the weight of the blind and improve operation of raising or lowering the blind. In particular, it is known to provide a spring assist module in the head rail of an architectural covering. The spring assist module stores energy when a blind is extended, e.g. lowered and releases this energy to assist in retracting, e.g. raising of the blind, for instance with a roller, drive shaft, lift spool or the like.

US 2005/0217805 describes the use of a spring motor having a spring tape which is wound from a storage shaft onto an output shaft as the blind is lowered. The stored resilient energy in the spring acts to assist in lifting of the blind when the spring tape returns from the output shaft to the storage shaft.

Arrangements such as that described in US 2005/0217805 are undesirably bulky. The present application considers that it would be desirable to provide rails having depths and heights (perpendicular to the elongate length of the rail) no more than 25 mm.

It is thus an object of the present invention to provide a spring assist module of low cost and/or low complexity which can be used with rails of relatively short length and having a small width, i.e. a small height and/or depth.

SUMMARY

According to the present invention, there is provided a rail for an architectural covering. Although the rail may preferably be a head rail, it can also be provided as a bottom rail and/or an intermediate rail. The rail includes a housing having elongate walls extending along the length of the housing. The walls also define between them a width or thickness of the housing, which will be the height and/or depth of that housing. A drive axis extends along the length of the housing and a drive shaft is rotatable about that drive axis. The drive shaft is configured to wind and unwind a lift cord or blind material of the architectural covering. The rail includes a spring assist module having an output shaft rotatable about an output axis with rotation of the drive shaft. The spring assist module is mounted in the housing with the output axis parallel to the drive axis, but offset from the drive axis with respect to the width (in other words, the height and/or depth) of the housing. Also, the output shaft is connected directly to the drive shaft for rotation therewith. In this way, by directly connecting the output shaft of the spring assist module to the drive shaft, but offsetting the output axis from the drive axis, it becomes possible to make optimum use of the full width of the rail. The spring assist module may be positioned as close as possible to one of the walls of the housing. A relatively uncomplicated and cost-effective mechanism is thus provided whilst allowing full use of the width of the housing as defined between its elongate walls.

A coupling member may directly connect the output shaft to the drive shaft. The coupling member has a first end rotationally fixed to the output shaft and rotatable about the axis. It also has a second end rotationally fixed to the drive shaft and rotatable about the drive axis. Considering a centre that extends through the coupling member between its first and second ends, the coupling member is rotatable about that centre with rotation of the output shaft and the drive shaft.

This provides a straightforward and secure way of transferring rotational drive between the spring motor and the drive shaft whilst allowing a compact arrangement in the width (height/depth) direction of the housing.

With the coupling member elongate in the direction of the length of the housing, the first and second ends of the coupling member may be separated in the direction of the length of the housing. In this way, there is no concern regarding fitting the coupling member within the width (height/depth) of the housing.

Although the coupling member could be relatively rigid with joints, such as universal joints, at each end, in some embodiments, the coupling member may be a flexible member. Such a flexible member could be embodied as a torsion spring, or a rubber rod or suchlike.

In use, the rail may be mounted against an architectural surface. Hence, the rail may be configured with a rear side facing the architectural surface and a front side facing away from the architectural surface. In this respect, the width or thickness of the housing can be considered to be its depth. In this arrangement, the output axis and the drive axis are preferably offset in a direction extending from the front side to the rear side.

It is possible to provide a spring assist module with a torsion spring. However, if a large stroke is needed, a long torsion spring is required and this will be unsuitable for rails of relatively small length.

As will be explained below, it may be convenient to allow a portion of the spring assist module to extend rearwardly out of the housing and out of view when the rail is in a mounted condition. In this respect, preferably, the output axis is offset from the drive axis towards the front side.

The spring assist module may include a spring motor having a spring tape which is unwindable from about a storage axis parallel with the output axis. The spring tape is configured to wind resiliently around the output shaft with rotation of the output shaft. A casing may be provided for surrounding and supporting at least the spring tape wound about the storage axis. In some embodiments, at least part of that casing may extend outwardly of the housing. In particular, at a position at an opposite side of the drive axis to the output axis, the casing may extend outwardly in a width direction beyond the width of the housing along a remainder of the length of the housing.

In this way, a housing of relatively small width or thickness (height/depth) may be provided, but a spring motor may accommodate a spring tape of larger extent by protruding the spring motor outwardly of the housing only at that part of the rail where the spring motor is positioned.

The walls of the housing may define an aperture through which the casing of the spring motor protrudes.

The spring tape may have an output end connected to the output shaft. However, a storage end of the spring tape can be unconnected and rotate freely about the storage axis. By omitting the use of a storage shaft on which to wind the spring tape, the spring tape can be wound into a smaller volume for storage and the overall arrangement is simplified. Also, the storage axis is able to move towards and away from the output axis as tape is unwound and wound.

The spring tape may have a digressive spring characteristic so that a torque exerted on the drive shaft increases as more of the spring tape is wound around the storage axis. In this way, as more of the weight of a blind is supported by the drive shaft during lifting or lowering of the blind, the torque provided by the spring tape for supporting that weight increases.

It is desirable that the drive shaft should be able to rotate so as to extend a lift cord or blind material by at least 1.75 m. Hence, the stroke of the spring tape, by virtue of its length, from its fully wound condition around the storage axis to its fully wound condition around the output axis, preferably corresponds to rotation of the drive shaft for extending a lift cord or blind material by that amount.

At least one lift spool may be mounted to the drive shaft for rotation with the drive shaft. The lift spool may be configured to wind and unwind a respective lift cord therefrom.

The lift spool may be keyed to the drive shaft. The lift spool is preferably conical with respect to the drive axis.

There may also be provided at least one tilt pulley for supporting a respective tilt cord. The tilt pulley may be keyed to the drive shaft. The tilt cord preferably loops around half the circumferential extent of the tilt pulley.

According to the present invention, there may also be provided an architectural covering assembly including a rail of the present invention with at least one spring assist module. In this respect, it may be noted that two or more spring assist modules, for instance two or more spring motors may be provided along the length of the rail.

The architectural covering assembly may be provided with another rail parallel with the rail of the present invention and provided at an opposite side to the blind. Indeed, one or more additional intermediate rails may also be provided.

A plurality of slats may be arranged parallel with the rail of the present invention and between that rail and the opposite rail.

Where the rail includes a lift spool, the architectural covering assembly may be provided with at least one lift cord secured at one end to the opposite rail and at another end to the lift spool. The lift cord may be arranged to be wound and unwound from the lift spool so as to retract and extend the opposite rail and the slats.

Where the rail is provided with a tilt pulley, the architectural covering assembly may be provided with at least one tilt cord looped around half the circumferential extent of the tilt pulley. Preferably, the tilt cord connects with both sides of a ladder supporting the plurality of slats. The tilt pulley may be configured to slip relative to the tilt cord when the tilt cord resists movement as a result of the plurality of slats being fully tilted against each other. This may be in either tilted orientation.

BRIEF DESCRIPTION OF THE FIGURES

The invention will be more clearly understood from the following description, given by way of example only, with reference to the accompanying drawings, in which.

DETAILED DESCRIPTION

An embodiment of the present invention will be described with reference to a spring assist module in a "cordless" Venetian blind. This is a Venetian blind in which operations of raising, lowering and tilting of the slats is achieved by manipulating the bottom rail.

Figure 1:
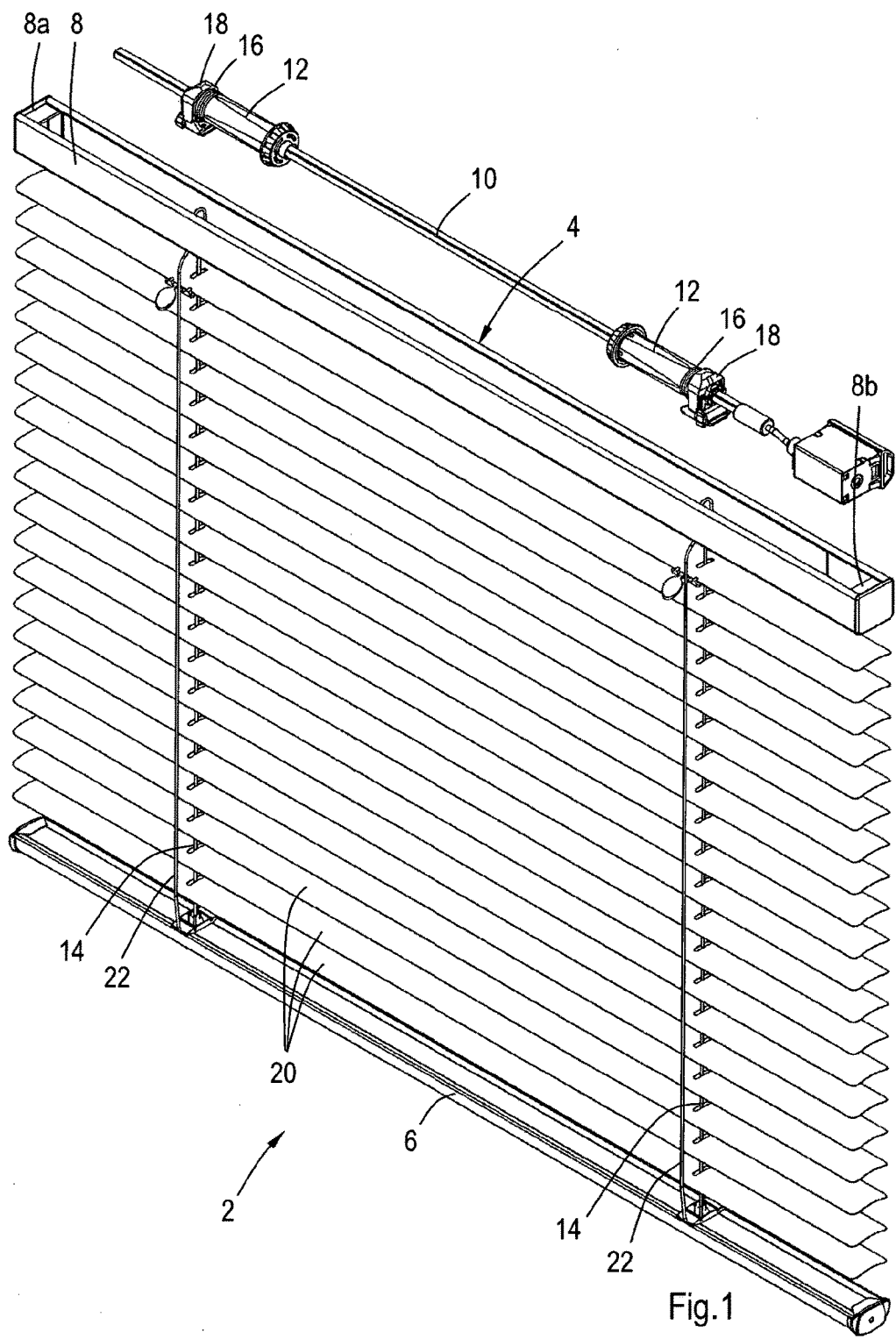
FIG. 1 illustrates a complete architectural covering assembly including a rail of the present invention with a plurality of slats.

As illustrated in FIG. 1, the architectural covering 2 of this embodiment takes the form of a Venetian blind having a head rail 4 and a bottom rail 6.

An embodiment of the present invention will be described with reference to the head rail 4 as an example of a rail embodying the present invention. It includes a housing 8 having walls that extend along the length of the housing 8 between first and second ends 8a, 8b. The housing has a height and a depth perpendicular to the length. The distance of the height and/or depth will be considered as the thickness or width of the housing 8.

A drive axis can be considered to extend along the length of the housing 8 and a drive shaft 10 is mounted so as to be positioned on this drive axis and rotate about the drive axis.

In the illustrated embodiment, two drive spools 12 are provided on the drive shaft 10. The drive spools 12 are arranged to rotate with the drive shaft 10. In this respect, they may be fixed rotationally relative to the drive shaft 10 by being keyed thereto. In some embodiments, it may be useful for the spools 12 to be movable along the axial length of the drive shaft 10.

Lift cords 14 extend through openings in a bottom wall of the housing 8 and connect with the bottom rail 6. The lift cords 14 may be wound around their respective lift spools 12 so as to draw the bottom rail 6 towards the head rail 4, retracting the blind and, as illustrated, lifting the blind. Similarly, the lift cords 14 may be unwound from their respective spools to extend the bottom rail 6 away from head rail 4.

In the illustrated embodiment, the architectural covering includes a blind formed from a plurality of slats 20. The slats are positioned as an array between the head rail 4 and the bottom rail 6 and are arranged to be parallel therewith. When the bottom rail 6 is retracted by the lift cords 14 towards the head rail 4, successive slats 20, starting from the slat closest to the bottom rail 6, are lifted towards the head rail 4.

In the illustrated embodiment, tilt pulleys 16 are provided. In particular, two tilt pulleys 16 are provided, each adjacent a respective lift spool 12. This enables tilt cords 22 to be positioned alongside the lift cords 14 in a convenient manner.

The tilt pulleys 16 are mounted on the drive shaft 10 so as to rotate with it. In this respect, like the lift spools 12, the tilt pulleys may be keyed to the drive shaft 10.

The tilt cords 22 may be attached to or form part of known cord support ladder structures for supporting the plurality of slats 20 and enabling them to be tilted. Each tilt cord 22 extends over a respective tilt pulley 16 (over the top of the tilt pulley 16 as illustrated), preferably over about half the circumferential extent of the tilt pulley 16. Thus, when the tilt pulleys 16 are rotated, the respective tilt cord 22 will move with the tilt pulleys 16 so that, on one side of the architectural covering, the tilt cord 22 will move towards the head rail 4 and, on the other side of the architectural covering, the tilt cord 22 will move away from the head rail 4. This will operate the ladder structures so as to tilt the plurality of slats 20.

Figure 2:
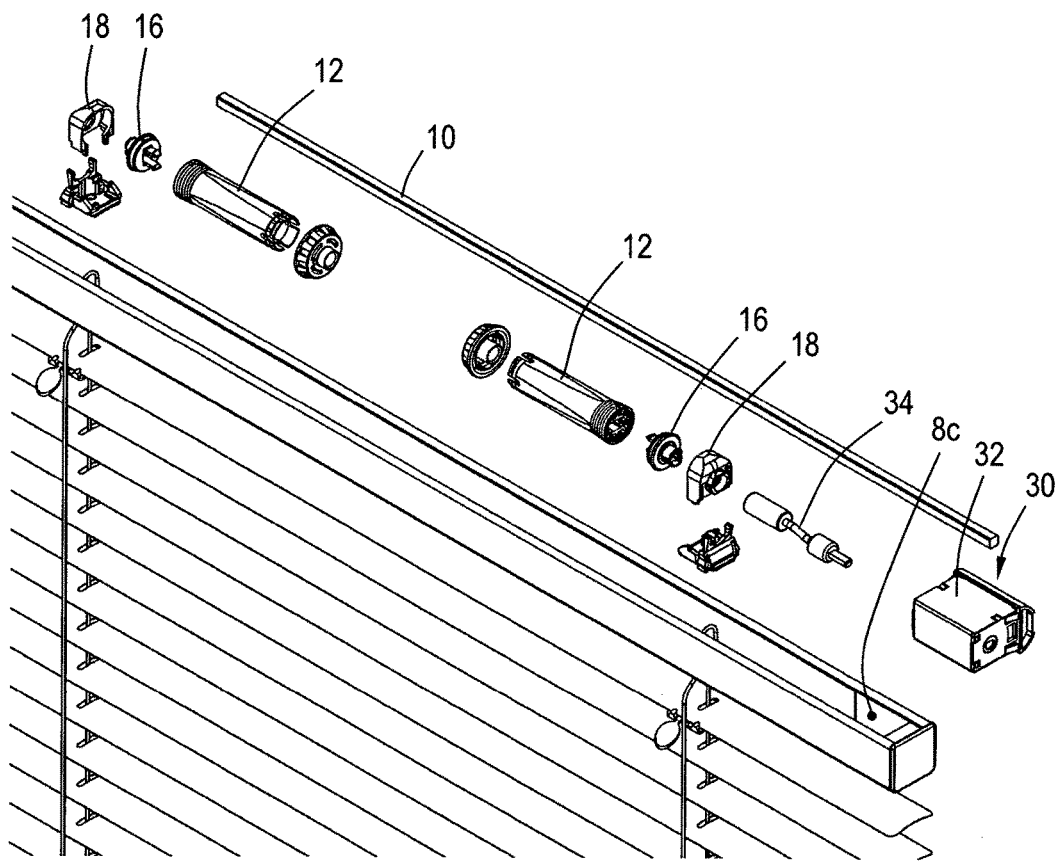
FIG. 2 illustrates lift and tilt components of the rail of FIG. 1.
Figure 3:
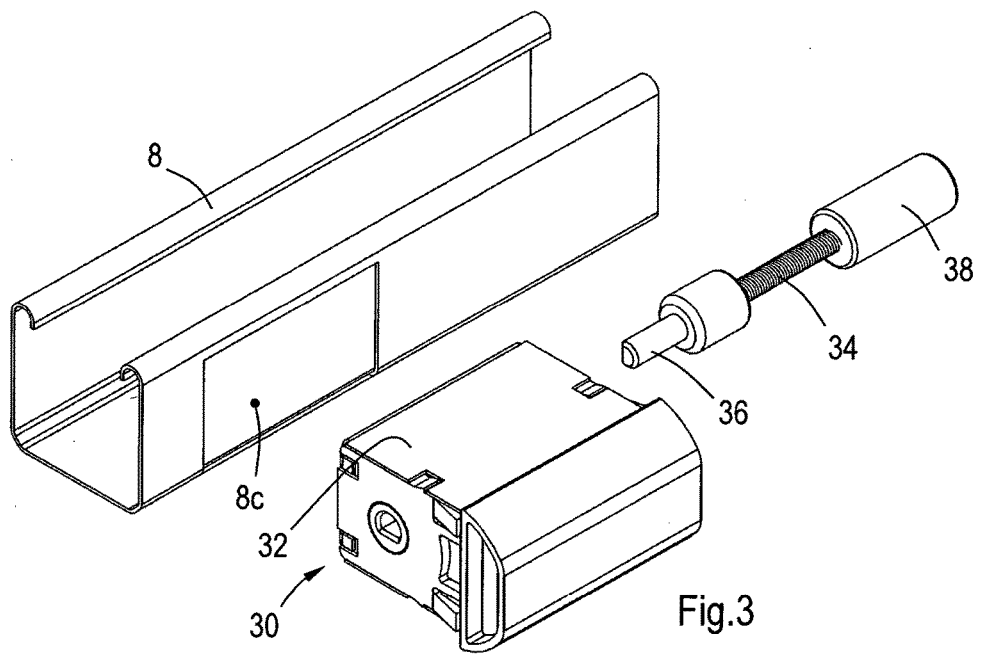
FIG. 3 illustrates the spring motor and its coupling member for use in the arrangement of FIG. 1.

For completeness, it will be noted that FIG. 2 illustrates the use of a cradle 18 for supporting the tilt pulley 16 and providing a guide for the lift and tilt cords through the bottom of the head rail 4.

Complete operation of the blind can be achieved merely by rotation of the drive shaft 10. Starting from an extended position as illustrated in FIG. 1, if the drive shaft 10 is rotated so as to rotate the lift spools 12 to wind up the lift cords 14, the tilt pulley 16 will rotate, thereby tilting all of the plurality of slats 20. Of course, rotation of the drive shaft 10 can be stopped at any point so as to leave the slats with the required orientation of tilt. If drive of the drive shaft 10 is continued, the slats 20 will contact each other and further tilting is no longer possible. The tilt pulleys 16 are arranged to allow the tilt cords 22 to slip relative to their tilt pulleys 16. Hence, the tilt pulleys 16 can continue to rotate with rotation of the drive shaft 10 and lift spools 12 as the lift cords 14 raise the bottom rail 6 and the slats 20.

When rotation of the drive shaft 10 is reversed, the tilt pulleys 16 will rotate in an opposite direction, thereby changing the tilt orientation of the plurality of slats 20. Such rotation can be stopped at any point so as to leave the slats 20 at a required orientation of tilt. However, if rotation is continued, the slats 20 will continue tilting until the slats 20 contact each other and further tilting is no longer possible. Once again, the tilt cords 22 slip relative to their tilt pulleys 16, the tilt pulleys 16 rotate with the drive shaft and the lift spools 12 unwind the lift cords 14 so as to lower the bottom rail 6 and the slats 20.

As illustrated, a spring assist module 30 is provided towards one end of the head rail 4 and connects with the drive shaft 10. In the illustrated embodiment, the walls of the housing 8 define an aperture 8c through which a casing 32 of the spring assist module 30 extends. As illustrated, the aperture 8c can be provided at the rear of the housing 8 for facing an architectural structure against which the architectural covering is mounted. In this way, the extension of the casing 32 out of the housing 8 is not visible with the architectural covering mounted in use and does not affect the appearance of the architectural covering. Details of the spring assist module 30 will be described in greater detail below.

Rotational output from the spring assist module 30 is transferred directly to rotation of the drive shaft 10 by means of a coupling member 34. The coupling member 34 has a first end 36 which engages with output of the spring assist module 30, for example an output shaft to be described in greater detail below, so as to rotate with output of spring assist module 30. As illustrated, the first end 36 may have a non-circular cross section for fitting into a corresponding non-circular output fitting of the spring assist module 30.

A second end 38 of the coupling member 34 similarly engages with an end of the drive shaft 10. In the illustrated embodiment, the drive shaft 10 has a non-circular cross section and the second end 38 of the coupling member 34 has a corresponding non-circular opening for engaging with the cross section of the drive shaft 10.

Thus, the first end 36 of the coupling member 34 itself rotates about the output axis of the spring assist module 30 and, similarly, the second end 38 of the coupling member 34 rotates about the drive axis of the drive shaft 10. The first and second ends 36, 38 are separated from one another by the length of the coupling member 34 in the direction of the length of the housing 8 and the coupling member 34 rotates along its length about its centre so as to transfer rotation and torque between the output of the spring assist module 30 and the drive shaft 10.

It should be noted that the rotational output axis of the spring assist module 30 is not in line with the rotational drive axis of the drive shaft 10. In particular, the two axes are parallel, but are offset from one another. In the illustrated embodiment, this offset is in a forward/rearward direction that is perpendicular to the extension/retraction direction of the blind. As illustrated, with the casing 32 of the spring assist module 30 extending rearwardly through the aperture 8c of the housing 8, the output axis of the spring assist module 30 is positioned forward of the rotational axis of the drive shaft 10.

Thus, although the first and second ends 36, 38 of the coupling member 34 rotate about the respective axes of the output of the spring assist module 30 and the drive shaft 10 and also the coupling member 34 rotates along its length about its centre, the coupling member 34 is not itself axial but extends, along its length from one axis to another. Such a coupling member 34 could be achieved using a fixed element extending between two universal joints at each end. However, in the illustrated embodiment, the coupling member 34 is embodied as a flexible member, for instance as a torsion spring or as a rubber rod.

Preferably, at least one of the two ends 36, 38 of the coupling member 34 is not fixed axially with respect to the output axis of the spring assist module 30 and the drive shaft 10 respectively. This can be achieved, as described above, by the use of non-circular matching cross-sections, such that the coupling member 34 merely keys with one or both of the output axis of the spring assist module 30 and the drive shaft 10. When the coupling member 34 rotates, twisting and bending along its length between the two offset axes, there may be some change in the distance between its two ends 36, 38 in the direction of the length of the housing 8. By allowing one or both ends 36, 38 to move axially, such changes may be accommodated, allowing easier rotation with less stress.

Figure 4:
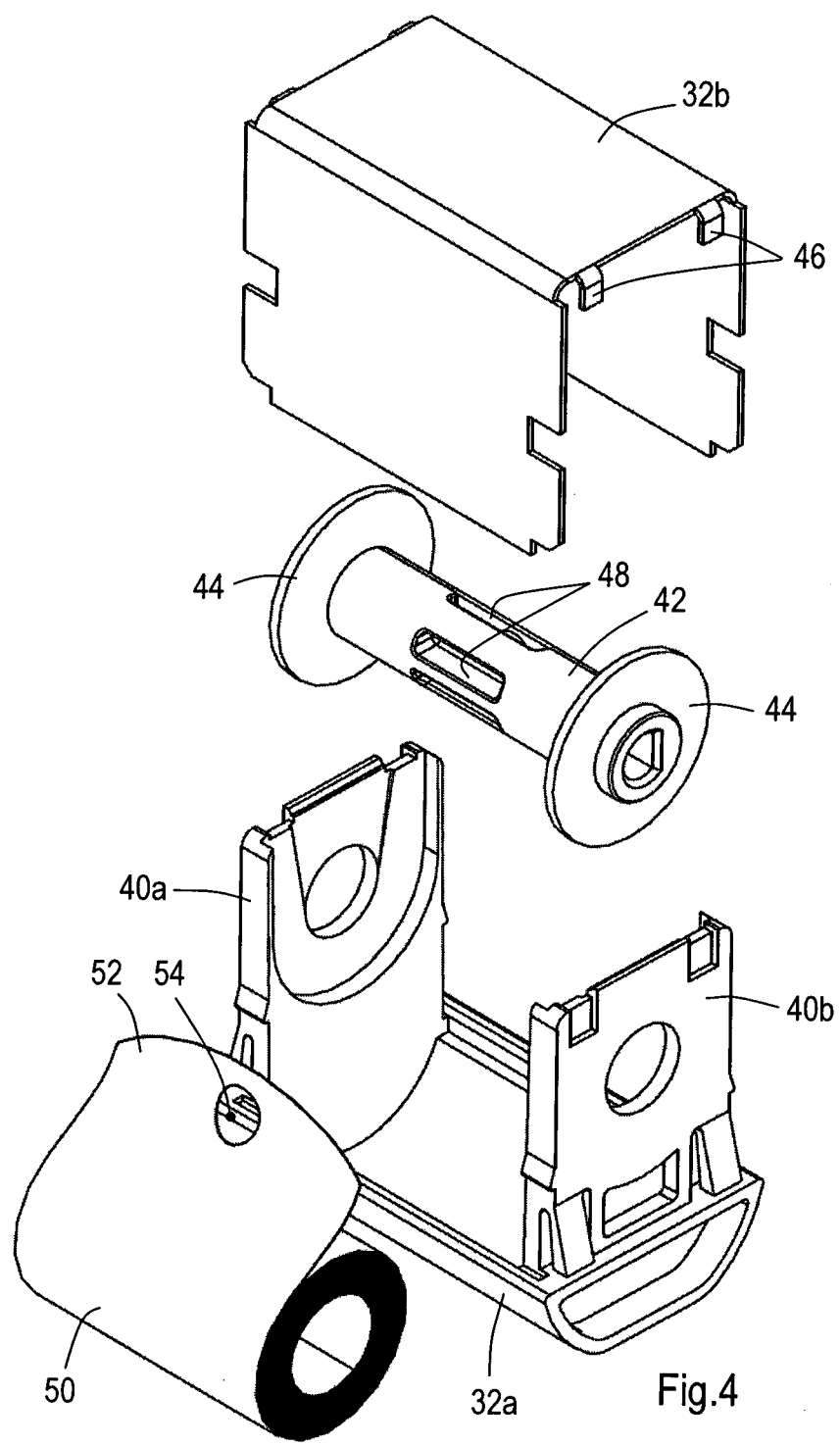
FIG. 4 illustrates the component parts of the spring motor of FIG. 3.
Figure 5:
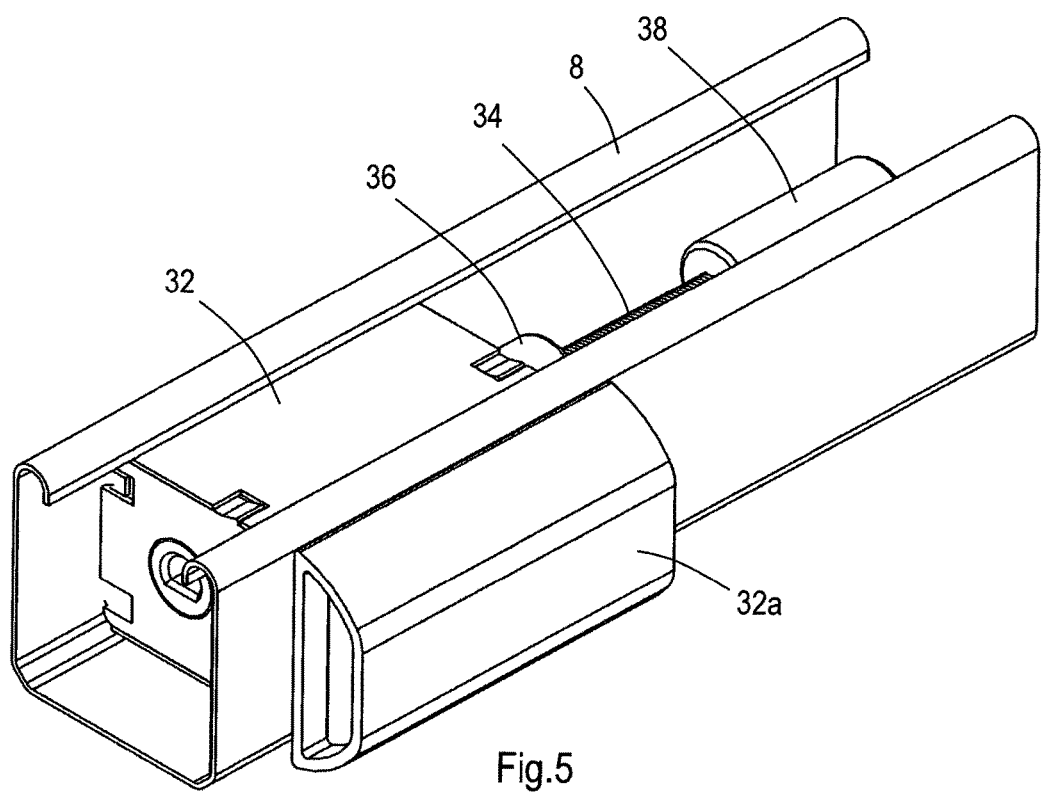
FIG. 5 illustrates an end part of the rail of FIG. 1 incorporating a spring motor.

The component parts of the spring assist module 30 housed within the casing 32 are illustrated in FIG. 4.

In this illustrated embodiment, the casing 32 comprises a first half 32a to extend out of the housing 8 and a second half 32b.

The first half 32a includes two parallel walls 40a, 40b forming opposite ends of the casing 32. Facing sides of the walls 40a, 40b are shaped so as to receive and rotationally mount an output shaft 42.

In the illustrated embodiment, both walls 40a, 40b define through holes by which connection may be made with the output shaft 42. This allows use of the spring assist module 30 at either end of a rail. However, it will be appreciated that only one through hole need be provided.

The walls 40a, 40b may be sufficiently elastic to flex apart so as to allow the output shaft 42 to be inserted between them before being resiliently held in place. Either end of the output shaft 42 is provided with a respective flange 44 so that the output shaft 42 is held in place between the walls 40a, 40b and is rotatable about an output axis with its end held in the respective through holes (or optionally an indented portion at one end) of the walls 40a, 40b.

FIG. 4 illustrates extension tags 46 which extend around the outside of the walls 40a, 40b so as to prevent them moving apart, thereby retaining the output shaft 42 in place. The output shaft 42 is mounted on an output axis offset to one side of the casing 32. This leaves a space at the other side of the casing 32 for a spring tape 50. The spring tape 50 is a resilient tape of known type which, at rest, forms a tightly wound roll as illustrated in FIG. 4. Against the resilience of the tape 50, the roll may be unwound. Unlike previous known usages of spring tapes 50, the spring tape 50 of the illustrated embodiment is not wound about a shaft. Instead, an outer surface of the spring tape 50 is guided by an inner face of the casing 32. In this respect, at least portions of the casing 32 includes curved surfaces approximately matching the outer curved surface of the spring tape 50 so as to guide its movement.

An outer end 52 of the spring tape 50 is secured to the output shaft 42. Any appropriate attachment may be made. However, as illustrated, the output shaft 42 may be provided with axially extending slots 48 into which the end 52 may be inserted and secured. Indeed, a protrusion on the output shaft 42 may engage with an aperture 54 in the end 52 of the spring tape 50. The natural resilience of the spring tape 50 may act to secure the engagement between the end 52 of the spring tape 50 with the output shaft 42.

Operation of the spring assist module 30 with respect to operation of the architectural covering will now be described.

As the bottom rail is moved away from the head rail so as to extend the blind, the drive shaft 10 rotates, by means of the coupling member 34, the output shaft 42 so as to unwind the spring tape 50 from its natural state and wind it around the outside of the output shaft 42. As more of the blind is unwound and the blind material gradually exerts a smaller torque (in case of a venetian blind) or a larger torque (in case of a roller blind) on the output shaft 10, more of the spring tape 50 is wound, against its natural resilience, onto the output shaft 42. The resilience of the spring tape 50 and its resulting rotational force or torque on the output shaft 42 acts to counterbalance the weight of the blind. Similarly, this rotational force or torque assists a user when retracting the blind.

The arrangement as described above is particularly advantageous. Because the spring tape 50 does not rotate about a fixed shaft, but, instead, defines its own storage axis about which it rotates, that storage axis is able to move towards and away from the output axis of the output shaft 42 according to the amount of spring tape 50 wound on to the output shaft 42. This enables the amount of spring tape 50 housed within the casing 32 to be increased. It is desirable that the total stroke of the spring tape allows sufficient rotation of the drive shaft 10 to extend a blind by at least 1.75 meters. Of course, it is undesirable to have an unnecessarily large head rail 4. The described arrangement allows an increase in the length of spring tape 50 within a small casing 32. Some additional space may be achieved by, as explained above, extending the casing 32 out of a rearward portion of the housing 8 of the head rail 4. In order to maximise full use of the space within the casing 32 as explained above, the output axis of the output shaft 42 is preferably not aligned with the axis of the drive shaft 10. Nevertheless, the arrangement described above allows direct connection between the output shaft 42 and drive shaft 10 so as to transmit rotation and torque fully and without slip. Also, connection between the output shaft 42 and drive shaft 10 is uncomplicated and space efficient with respect to the height/depth of the head rail 4.

The invention claimed is:

1. A rail for an architectural covering, said rail comprising:
    a housing having front and rear walls extending in a lengthwise direction along a length of said housing, said front and rear walls spaced apart in a widthwise direction and defining therebetween a width of said housing;
    a drive shaft rotatable about a drive axis extending in the lengthwise direction of said housing;
    a spring assist module having an output shaft rotatable about an output axis, said spring assist module mounted in said housing with said output axis parallel to said drive axis but offset from said drive axis in the widthwise direction of said housing; and
    a coupling member coupled between said output shaft to said drive shaft, said coupling member including a first end, an opposed second end, and a middle portion extending between said first and second ends, said first end of said coupling member coupled to said output shaft for rotation therewith about said output axis, said second end of said coupling member coupled to said drive shaft for rotation therewith about said drive axis;
    wherein said first end of said coupling member is axially moveable relative to said output shaft along said output axis and said second end of said coupling member is axially moveable relative to said drive shaft along said drive axis when torque is being transmitted through said coupling member.

2. A rail according to claim 1, wherein said first end of said coupling member is offset from said second end of said coupling member in the lengthwise direction of said housing.

3. A rail according to claim 1, wherein said coupling member is a flexible member.

4. A rail according to claim 1, wherein said coupling member is a torsion spring or a rubber rod.

5. A rail according to claim 1, wherein:
    said rear wall of said housing is configured to be mounted against an architectural surface with said front wall of said housing facing away from the architectural surface.

6. A rail according to claim 5, wherein said output axis of said spring assist module is disposed between said front wall of said housing and said drive axis in the widthwise direction of said housing.

7. A rail according to claim 1, wherein a portion of said spring assist module extends outwardly in the widthwise direction to an exterior of said housing.

8. A rail according to claim 7, wherein at least one of said front wall or said rear wall of said housing defines an aperture through which said spring assist module protrudes.

9. A rail according to claim 1, wherein said spring assist module includes a spring motor having a spring tape unwindable from a storage axis parallel with said output axis of said spring assist module and configured to wind resiliently around said output shaft of said spring assist module with rotation of said output shaft.

10. A rail according to claim 9, wherein:
said spring motor includes a casing for surrounding and supporting at least said spring tape wound about said storage axis; and
a portion of said casing extends outwardly in the widthwise direction to an exterior of said housing.

11. A rail according to claim 10, wherein at least one of said front wall or said rear wall of said housing defines an aperture and said casing protrudes through said aperture.

12. A rail according to claim 9, wherein said spring tape has an output end connected to said output shaft and a storage end which is not connected to any shaft and winds freely around said storage axis.

13. A rail according to claim 9, wherein said spring tape is configured to exert an increased torque on said drive shaft as more of said spring tape is wound around said storage axis.

14. A rail according to claim 9, wherein:
said spring tape has a stroke from fully wound around said storage axis to fully wound around said output axis; and
said stroke corresponds to a rotation of said drive shaft to extend a lift cord or blind material by at least 1.75 m.

15. A rail according to claim 1, further including at least one lift spool mounted to said drive shaft for rotation therewith, said at least one lift spool being configured to wind and unwind a respective lift cord therefrom.

16. A rail according to claim 15, wherein said at least one lift spool is conical with respect to said drive axis.

17. A rail according to claim 1, further including a tilt cord and a tilt pulley keyed to said drive shaft for supporting said tilt cord.

18. A rail according to claim 17, wherein said tilt cord is looped around at least half of a circumference of said tilt pulley.

19. A rail according to claim 1, wherein said rail corresponds to at least one of a head rail, a bottom rail, or an intermediate rail for an architectural covering.

20. An architectural covering assembly include a rail according to claim 1, further including:
an opposite rail parallel with said rail;
a plurality of slats arranged positioned between said rail and said opposite rail;
at least one lift spool coupled to said drive shaft for rotation therewith, and a lift cord secured at one end to said opposite rail and at another end to said lift spool, said lift cord arranged to be wound and unwound from said lift spool so as to retract and extend said opposite rail and said slats; and
at least one tilt pulley coupled to said drive shaft for rotation therewith, and a tilt cord looped around said tilt pulley and connecting with both sides of a ladder supporting said slats, said tilt pulley being configured to slip relative to said tilt cord when said tilt cord resists movement as a result of said slats being fully tilted against adjacent slats.

21. An architectural covering assembly according to claim 20, wherein rotation of said drive shaft both tilts said slats and raises or lowers said opposite rail and said slats.

22. A rail according to claim 7, wherein said spring assist module defines a width in the widthwise direction greater than the width of said housing.

23. A rail for an architectural covering, comprising:
a housing having opposing front and rear walls extending in a lengthwise direction along a length of said housing, said front and rear walls spaced apart in a widthwise direction and defining therebetween a width of said housing;
a drive shaft rotatable about a drive axis extending in the lengthwise direction of said housing; and
a spring assist module having a casing and an output shaft rotatable about an output axis, said output shaft coupled to said drive shaft for rotation therewith, said spring assist module including a spring assist motor having a spring tape unwindable from a storage axis parallel with said output axis of said spring assist module and configured to wind resiliently around said output shaft with rotation of said output shaft;
wherein:
said spring tape has an output end connected to said output shaft and a storage end which is not connected to any shaft and winds freely around said storage axis;
said casing of said spring assist module includes an outer wall defining an exterior of said spring assist module, said outer wall including a curved inner surface along an interior of said spring assist module which guides said spring tape when winding around said storage axis; and
said outer wall of said casing is configured to extend at least partially outside of said housing when said spring assist module is installed relative to said housing.

24. The rail according to claim 23, wherein said storage axis is free to move relative to said output axis in a direction parallel to said output axis.

25. The rail according to claim 23, wherein:
said spring tape includes a storage portion wound about said storage axis; and
said storage portion is free to move relative to said output axis in a direction parallel to said output axis.

26. The rail according to claim 23, wherein:
said spring tape is disposed within said casing and includes a storage portion wound about said storage axis; and
said storage portion contacts said curved inner surface of said casing.

27. The rail according to claim 23, wherein:
said spring tape has a length from its output end to its storage end; and
except for said output end of said spring tape, said spring tape is not connected to any structure along the length of said spring tape.

28. The rail according to claim 23, wherein said spring tape is connected only with said output shaft.

29. The rail according to claim 23, wherein said output axis is parallel to said drive axis but offset from said drive axis in the widthwise direction of said housing.

30. The rail according to claim 23, further comprising a coupling member coupled between said output shaft of said spring assist module to said drive shaft, said coupling member including a first end, an opposed second end, and a middle portion extending between said first and second ends, said first end of said coupling member coupled to said output shaft for rotation therewith about said output axis, and said second end of said coupling member coupled to said drive shaft for rotation therewith about said drive axis.

31. The rail according to claim 30, wherein said coupling member is a flexible member.

32. The rail according to claim 30, wherein said coupling member is a torsion spring or a rubber rod.

33. The rail according to claim 30, wherein said first end of said coupling member is offset from said second end of said coupling member in the lengthwise direction of said housing.

34. The rail according to claim 23, wherein said spring tape includes a curved outer surface, and wherein said curved inner surface of said casing approximately matches said curved outer surface of said spring tape.

* * * * *